Dec. 17, 1929.  A. MARTZLOFF  1,740,363
BRAKE OPERATING DEVICE
Filed June 11, 1928  2 Sheets-Sheet 1
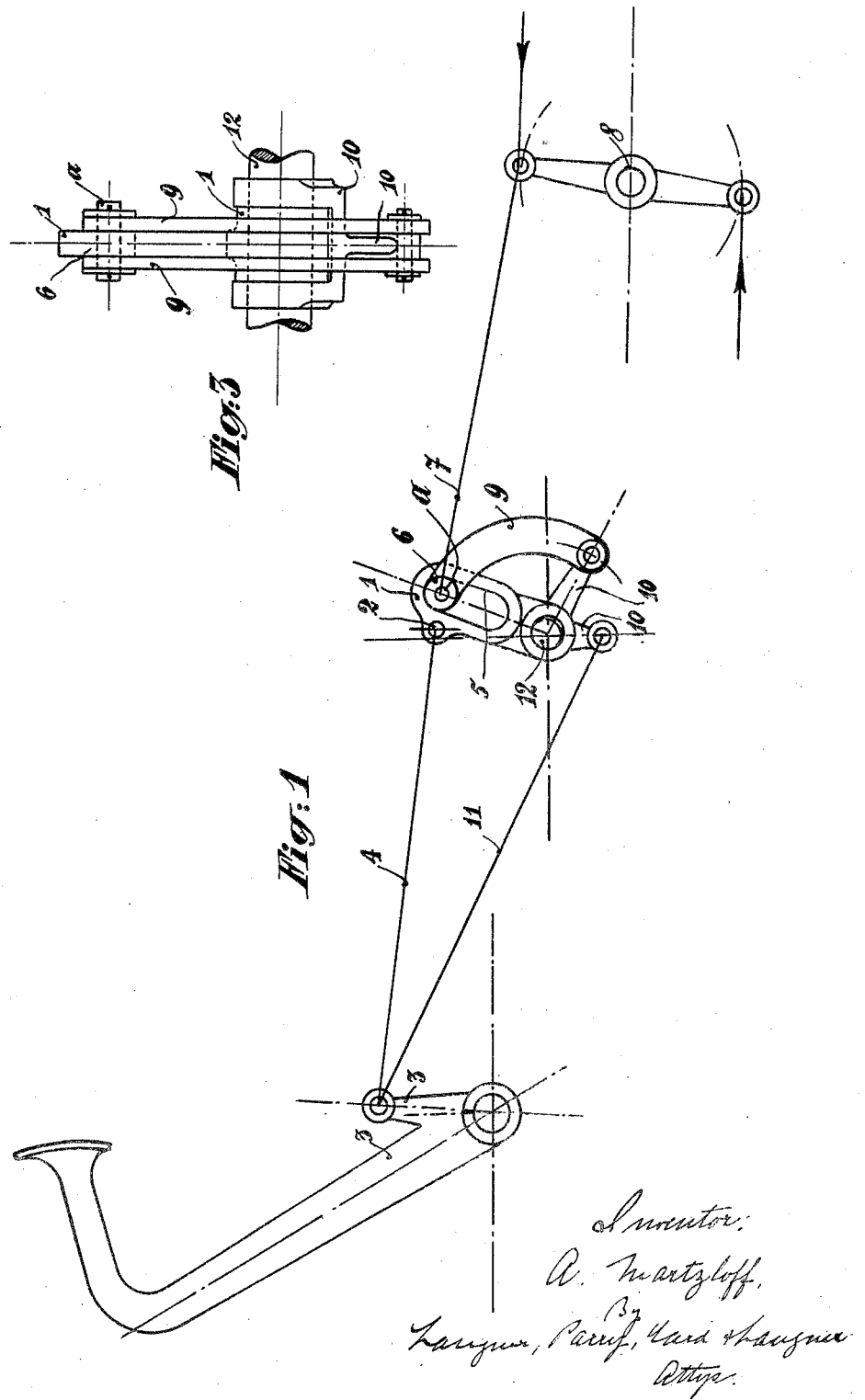

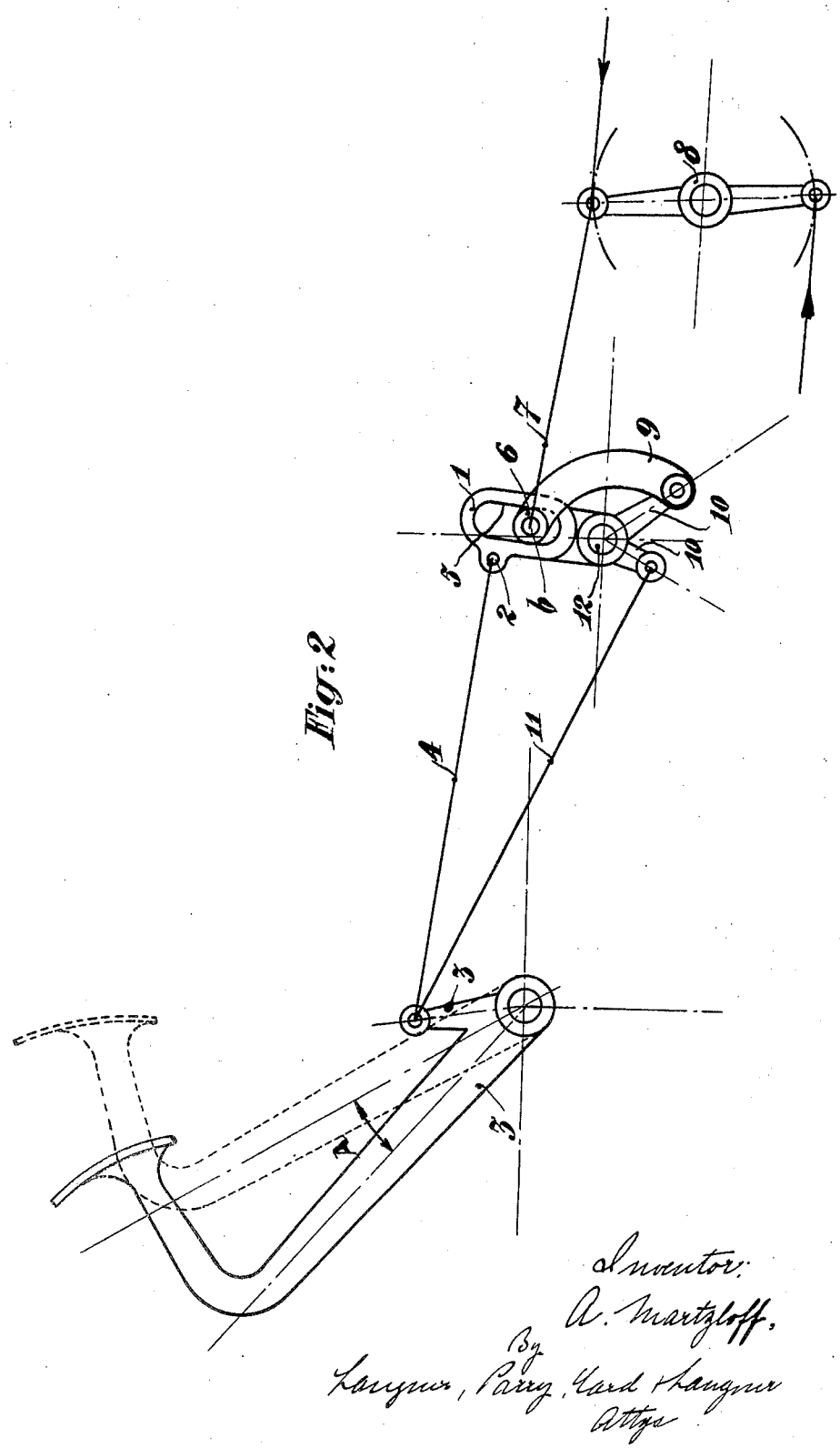

Patented Dec. 17, 1929

1,740,363

UNITED STATES PATENT OFFICE

ARMAND MARTZLOFF, OF VERSAILLES, FRANCE, ASSIGNOR TO SOCIÉTÉ ANONYME DES AUTOMOBILES "UNIC" PUTEAUX, OF SEINE, FRANCE, A COMPANY OF FRANCE

BRAKE-OPERATING DEVICE

Application filed June 11, 1928, Serial No. 284,562, and in France November 30 1927.

My invention relates to a motion control device for use with automobile brakes and the object of the invention is to provide such a device in which the force applied to the brakes may be multiplied at will, with the force applied to the pedal lever of the brake remaining constant.

The device is interposed between the control pedal and the operating arm or counter shaft of the front and rear wheel brakes and comprises essentially a compound lever arrangement connected to the pedal, which, following an action exerted on the pedal, causes the effective length of a lever connected to the operating arm of the brakes to vary progressively in such wise as to accomplish a progressive increase in the effective force applied to the brakes, the force applied to the pedal remaining constant.

The invention will be better understood by reference to the accompanying drawing forming a part of this specification given by way of example and in which—

Fig. 1 is a diagrammatical view of my device with the parts in the normal position of rest;

Fig. 2 is a view similar to Fig. 1 with the pedal depressed; and

Fig. 3 is an end view of the motion multiplying device.

Referring to the drawing, my device comprises a bell-crank lever 10 pivoted on a shaft 12, one arm of which is connected to the usual brake control pedal 3 by means of a rod 11. Also mounted on shaft 12 is a lever 1 provided with an elongated slot 5 and connected to pedal 3 by means of a rod 4 engaging an eye 2 thereof. In the said slot of lever 1 slides a roller 6 carried at one end of an arcuate link 9 pivoted at its other extremity to the other arm of bell-crank 10. The shaft of roller 6 is connected to a rod 7 which in turn is fastened to the operating arm or motion relaying device 8 of the front and rear wheel brakes.

The device operates in the following manner:

The pedal 3 being in a position of rest, the levers 10 and 1 and the link 9 of the motion amplifying device have the respective positions shown in Fig. 1, roller 6 occupying the position indicated by $a$ at the upper extremity of slot 5.

When the operator acts on the pedal 3 and causes it to swing through an angle A (Fig. 2), the rods 4 and 11 draw on their respective levers 1 and 10 and cause them to swing through a certain angle in opposite directions about the shaft 12 as a center at which time the roller 6 progressively descends to the position $b$ in slot 5, which position will depend upon the magnitude of the angle A. The arm of lever 1, which receives the force from the pedal through rod 4, which is constant, being longer than the lever arm which acts on rod 7, the force transmitted to operating arm 8 will be multiplied to an extent depending upon the distance through which the roller 6 has travelled in slot 5.

It will be noticed that the distance through which roller 6 travels for a given angular displacement of the pedal can be adjusted at will by changing the length of rod 11 and link 9.

As shown in Fig. 3 the link 9 is composed of a link disposed on each side of the levers, but it is to be understood that in certain cases I may provide a solid link with bifurcated extremities.

While I have disclosed what I deem to be the preferred form of my device I do not wish to be limited thereto as there might be various changes made in the construction and arrangement of parts without departing from my invention as comprehended within the scope of the appended claims.

Having thus described my invention what I claim as new and desire to secure by Letters Patent is—

1. A brake operating device of the type described comprising a brake control pedal, a brake operating arm, a shaft, a bell-crank on said shaft, a second lever on said shaft, a rod connecting one of the arms of said bell-crank to said brake pedal, a rod connecting said second lever to said brake pedal, a rod fastened to said brake operating arm and means interconnecting said second lever, the other arm of said bell-crank and said last mentioned rod for progressively multiplying a constant force applied to said brake pedal by changing the effective lever arm of said second lever.

2. A brake operating device of the type described comprising a brake control pedal, a brake operating arm, a shaft, a bell-crank on said shaft, a second lever on said shaft, a rod connecting one of the arms of said bell-crank to said brake pedal, a rod connecting said second lever to said brake pedal, an elongated slot formed in said second lever, a link pivoted to the other arm of said bell-crank, means carried by said link slidably engaging in said slot and a rod for connecting said link to said brake operating arm whereby a constant force applied to said brake pedal is progressively multiplied.

3. A brake operating device of the type described comprising a brake control pedal, a brake operating arm, a shaft, a bell-crank on said shaft, a second lever on said shaft, a rod connecting one of the arms of said bell-crank to said brake pedal, a rod connecting said second lever to said brake pedal, an elongated slot formed in said second lever, an arcuate link pivoted to the other arm of said bell-crank, means carried by said link slidably engaging in said slot and a rod for connecting said link to said brake operating arm whereby a constant force applied to said brake pedal is progressively multiplied.

4. A brake operating device of the type described comprising a brake control pedal, a brake operating arm, a shaft, a bell-crank on said shaft, a second lever on said shaft, a rod connecting one of the arms of said bell-crank to said brake pedal, a rod connecting said second lever to said brake pedal, an elongated slot formed in said second lever, a link pivoted to the other arm of said bell-crank, a roller carried by said link slidably engaging in said slot and a rod for connecting said link to said brake operating arm whereby a constant force applied to said brake pedal is progressively multiplied.

5. A brake operating device of the type described comprising a brake control pedal, a brake operating arm, a shaft, a bell-crank on said shaft, a second lever on said shaft, a rod connecting one of the arms of said bell-crank to said brake pedal, a rod connecting said second lever to said brake pedal, an elongated slot formed in said second lever, an arcuate link pivoted to the other arm of said bell-crank, a roller carried by said link slidably engaging in said slot and a rod for connecting said link to said brake operating arm whereby a constant force applied to said brake pedal is progressively multiplied.

6. A brake operating device of the type described comprising a brake control pedal, brake operating means, a shaft, a bell-crank on said shaft, a second lever on said shaft, means connecting one of the arms of said bell-crank to said brake pedal, means connecting said second lever to said brake pedal, means fastened to said brake operating means and means inter-connecting said second lever, the other arm of said bell-crank and said last mentioned means for progressively multiplying a constant force applied to said brake pedal by changing the effective lever arm of said second lever.

In testimony whereof I affix my signature.

ARMAND MARTZLOFF.